United States Patent
Kantor et al.

(10) Patent No.: US 10,817,352 B2
(45) Date of Patent: Oct. 27, 2020

(54) SYSTEM AND METHOD FOR OPERATING A CHATBOT

(71) Applicant: International Business Machines Corporation, Armonk, NY (US)

(72) Inventors: Amir Kantor, Haifa (IL); David Amid, Modiin (IL); David Boaz, Bahan (IL); Ateret Anaby Tavor, Givat Ada (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/936,494

(22) Filed: Mar. 27, 2018

(65) Prior Publication Data

US 2019/0303218 A1    Oct. 3, 2019

(51) Int. Cl.
*G06F 3/00*    (2006.01)
*G06F 9/54*    (2006.01)

(52) U.S. Cl.
CPC .................... *G06F 9/543* (2013.01)

(58) Field of Classification Search
CPC ........................................ G06F 9/54
USPC ........................................ 719/310
See application file for complete search history.

(56) References Cited

U.S. PATENT DOCUMENTS

| | | | |
|---|---|---|---|
| 9,369,410 B2 | 6/2016 | Capper et al. | |
| 2017/0180284 A1 | 6/2017 | Smullen et al. | |
| 2017/0344532 A1* | 11/2017 | Zhou | G06F 17/2881 |
| 2017/0366478 A1* | 12/2017 | Mohammed | H04L 51/02 |
| 2018/0278554 A1* | 9/2018 | Kassabgi | H04L 51/02 |
| 2018/0357096 A1* | 12/2018 | McConnell | G06F 17/2785 |
| 2019/0089655 A1* | 3/2019 | Uppala | G06Q 10/02 |
| 2019/0199658 A1* | 6/2019 | Kim | G06N 20/00 |
| 2019/0207877 A1* | 7/2019 | Chung | G06N 3/006 |
| 2019/0266287 A1* | 8/2019 | Chen | G06F 16/3329 |
| 2019/0267001 A1* | 8/2019 | Byun | G06F 40/35 |

FOREIGN PATENT DOCUMENTS

| | | | |
|---|---|---|---|
| WO | 2016161432 | 10/2016 | |
| WO | WO-2018037401 A1 * | 3/2018 | ............. G06F 17/30 |

OTHER PUBLICATIONS

John P. McIntire, Methods for Chatbot Detection in Distributed Text-based Communications. (Year: 2015).*
"Alexa", Amazon. Available at: https://developer.amazon.com/alexa (retrieved Mar. 1, 2018).
"Google Assistant", Google. Available at: https://assistant.google.com/#?modal_active=none (retrieved Mar. 1, 2018).

* cited by examiner

*Primary Examiner* — Lechi Truong
(74) *Attorney, Agent, or Firm* — Dvir Gassner

(57) ABSTRACT

A method comprising operating a computerized chatbot to: calculate first and second scores representing a relevance of input received from a user to functionalities provided by respective first and second modules, respectively, of the chatbot; associate the first and second modules with respective first and second names; introducing the modules to the user using their associated names; selecting a module to interact with the user based on at least one of: a name mentioned by the user and a score and switching between the first and second modules based on the names.

19 Claims, 3 Drawing Sheets

SYSTEM AND METHOD FOR OPERATING A CHATBOT

BACKGROUND

The invention relates to the field of chatbots.

Chatbots (or bots) are known in the art. Generally, chatbots are software applications that converses with a user or an application. Chatbot applications may reside within social messaging apps (e.g., Slack), or be part of intelligent personal assistant software (e.g., Apple's Siri). Typically, user interface (UI) of chatbot applications is connected to a messaging channel that enables a user to provide input and enables the chatbot application to provide output. UI with chatbots may be, or may include, text, speech (e.g., a natural-language conversation between the user and the bot) and/or may include visual, graphical user interface (GUI) objects or elements like buttons, images, and other means.

A chatbot typically includes, or uses, several modules also referred to in the art as skills. A chatbot's module or skill may be adapted to handle specific aspects, provide specific services and so on. For example, a first chatbot's module or skill may handle product search and selection in a store, a second module or skill may handle checkout, a third module or skill may handle customer membership issues and so on.

Reusing chatbot modules or skills can reduce cost and time by having several bots use the same module or skill. Some recent chatbot technologies have adopted skills that are activated by name, thus, for example, enabling third-party skills to be included in, or reused by, chatbots.

For example, Alexa®, an intelligent personal assistant by Amazon.com, Inc., is open for extension via third-party skills. Each of these skills needs to register a name with Alexa and the skill is invoked by Alexa when the user mentions its name. However, to invoke a skill with Alexa, the user must know the exact name of the skill. Moreover, skills or modules are perceived and used as independent, miniature applications by Alexa. Accordingly, when a conversation, interaction or session of a user with a first skill ends, e.g., the user is transferred to another, different or second skill, the state and/or context of the interaction with the first (former or previous) skill is lost.

Google® Assistant, by Google LLC, is yet another intelligent personal assistant that is open for extension via third-party skills invoked by name as described.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a system and method for operating a computerized chatbot. An embodiment may calculate first and second scores representing a relevance of input received from a user to functionalities provided by respective first and second modules associated with the chatbot; associate the first and second modules with respective first and second names; introduce the modules to the user using their associated names; select a module to interact with the user based on the first and second scores; and enable the user to interact with the first and second modules by mentioning their respective names. An embodiment may save a state of an interaction of a first module with the user; select a second module to interact with the user based on the state; and provide the state to the second module.

An embodiment may save a state of the first or second module with respect to an interaction of the first or second module with the user; interrupt operation of the first or second module, respectively; and resume operation of the first or second module, respectively, based on the state. Interrupting operation of the first module may be caused by detecting the user mentioned the name of the second module. Interrupting the operation may be performed by a module included in the chatbot. An embodiment may identify a new module based on a score received from the new module; and select the new module to interact with the user.

An embodiment may identify a capability of a module based on a score received from the module. Calculating the first and the second scores may be performed by one of: a root module, and respectively by the first and the second modules. Selecting of a module may be based on at least one of: an event, a context, a state, and input from the user. An embodiment may request additional information from the user and may select a module to interact with the user based on received additional information. Input received from the user may be at least one of: an utterance, an interaction with a graphical user interface (GUI) object, and a text.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
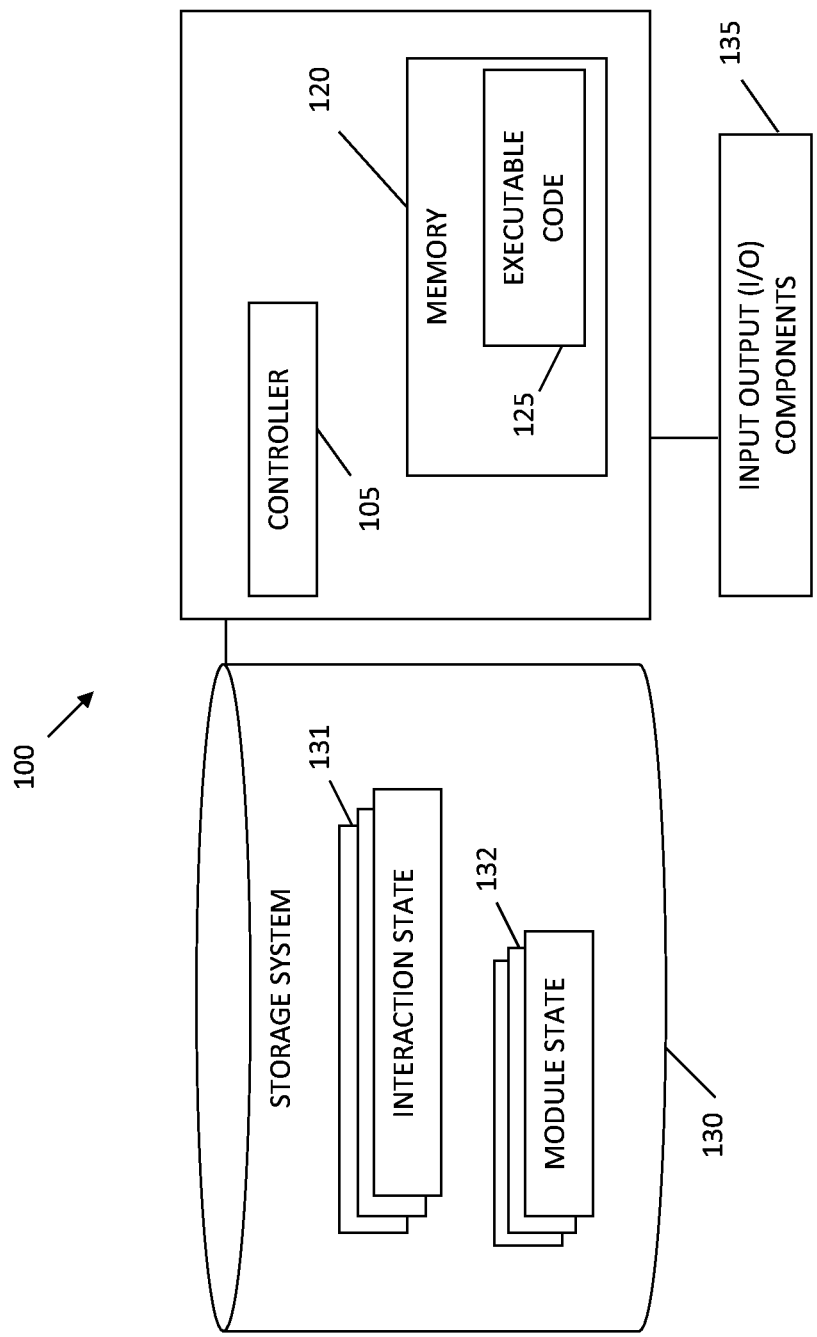
FIG. 1 shows high-level block diagram of a computing device according to illustrative embodiments of the present invention.

Disclosed herein is a chatbot that includes, or is operatively connected to, multiple modules (also referred to herein as "skills") that can each converse with a user. A root module in the chatbot controls operation of the modules; for example, the root module selects a module to converse with a user, provides the selected module with relevant data and causes the selected module to converse with the user. In some embodiments, names are automatically and/or dynamically assigned to, or associated with modules and the names are provided to the user. Modules can be activated based on mentioned names, for example, when a name assigned to a module is mentioned by the user, the module is caused to converse with the user. In another example, while conversing with a first module, the user can address a second module using the second module's name and thus cause the second module to interact with the user. Accordingly, embodiments of the invention provide a system that fully and adequately mimics human agents.

In some embodiments, modules can be interrupted and resumed during a conversation with a user, while maintaining a state and context of the conversation. For example, a first module conversing with a user stores information received from the user and is then interrupted when a second module is activated. At a later stage, the first module is resumed or reactivated and uses the stored information to continue the conversation with the user.

In some embodiments, several modules interact or share information during a conversation, e.g., by sharing state and context of a conversation. For example, information received from the user by a first module conversing with the user is stored and used, by a second module, to continue the conversation with the user.

In some embodiments, modules and/or modules' capabilities or functionalities are automatically and/or dynamically identified or discovered and used. For example, during a first time period, a chatbot includes, uses, or is associated with, a first and second modules, then, a third, additional (new) module or skill is added to, included in, registers with, or is otherwise associated with the chatbot and the newly-added third module and its capabilities are automatically discovered, identified and used by the chatbot. In another example, a module used by a chatbot is updated to provide additional or new services or functionalities and the additional or new services or functionalities are automatically discovered, identified and used by the chatbot.

For example, in some embodiments, input from a user is provided to all modules included in, registered with, or connected to a chatbot is also provided to newly, dynamically or recently added modules, each of the modules (including the newly-added modules) calculates a relevance score that represents how relevant the input is to functions or services provided by the module, thus, based on scores returned from the newly, dynamically or recently added modules, a root module identifies or discovers the new modules or new functions provided by updated modules. As further described, modules and/or capabilities, including dynamically and/or automatically added or included modules or capabilities are presented or introduced to a user.

Reference is made to FIG. 1, showing a non-limiting, high-level block diagram of a computing device or system 100 that may be used to operate a chatbot according to some embodiments of the present invention. Computing device 100 may include a controller 105 that may a hardware controller. For example, controller 105 may be, or may include, a central processing unit processor (CPU), a chip or any suitable computing or computational device. Computing system 100 may include a memory 120, executable code 125, a storage system 130 and input/output (I/O) components 135. Controller 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 100 may be included in, and one or more computing devices 100 may be, or act as the components of, a system according to some embodiments of the invention.

Memory 120 may be a hardware memory. For example, memory 120 may be, or may include machine-readable media for storing software e.g., a Random-Access Memory (RAM), a read only memory (ROM), a memory chip, a Flash memory, a volatile and/or non-volatile memory or other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

Executable code 125 may be an application, a program, a process, task or script. A program, application or software as referred to herein may be any type of instructions, e.g., firmware, middleware, microcode, hardware description language etc. that, when executed by one or more processors or controllers 105, cause a processing system or device (e.g., system 100) to perform the various functions described herein.

Executable code 125 may be executed by controller 105 possibly under control of an operating system. For example, executable code 125 may be an application that operates a chatbot as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein, e.g., chatbot skills, units or modules, may be, or may include, controller 105, memory 120 and executable code 125.

Storage system 130 may be or may include, for example, a hard disk drive, a CD-Recordable (CD-R) drive, a Blu-ray disk (BD), a universal serial bus (USB) device or other suitable removable and/or fixed storage unit. As shown, storage system 130 may include interaction state objects 131 and module state objects 132 (collectively referred to hereinafter as interaction states 131 and/or module states 132 or individually as interaction state 131 and/or module state 132, merely for simplicity purposes).

Content may be loaded from storage system 130 into memory 120 where it may be processed by controller 105. For example, module states 131 and interactions states 132 may be loaded into memory 120 and used for conducting a multi-module interaction or session with a user as further described herein.

In some embodiments, some of the components shown in FIG. 1 may be omitted. For example, memory 120 may be a non-volatile memory having the storage capacity of storage system 130. Accordingly, although shown as a separate component, storage system 130 may be embedded or included in system 100, e.g., in memory 120.

I/O components 135 may be, may be used for connecting (e.g., via included ports) or they may include: a mouse; a keyboard; a touch screen or pad or any suitable input device. I/O components may include one or more screens, displays or monitors, speakers and/or any other suitable output devices. Any applicable I/O components may be connected to computing device 100 as shown by I/O components 135, for example, a wired or wireless network interface card (NIC), a universal serial bus (USB) device or an external hard drive may be included in I/O components 135.

A system according to some embodiments of the invention may include components such as, but not limited to, a plurality of central processing units (CPU) or any other suitable multi-purpose or specific processors, controllers, microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

Where applicable, modules or units described herein, may be similar to, or may include components of, device 100 described herein. For example, modules shown in FIG. 2, e.g., CM 230 and MM 240 may be or may include a controller 105, memory 120 and executable code 125.

The terms "bot" and "bots" as used in this disclosure refer to any system or unit designed and operated to replace, mimic, or simulate a human, such that a user conversing with the bot as if he or she would convers with a human and not a with machine. For example, embodiments of the invention may be applicable to, used with, or embedded in, intelligent personal assistants, virtual agent, automated chat or interactive voice response (IVR) systems or any voice control system. The bot may converse with the user via speech and/or in writing.

Figure 2:
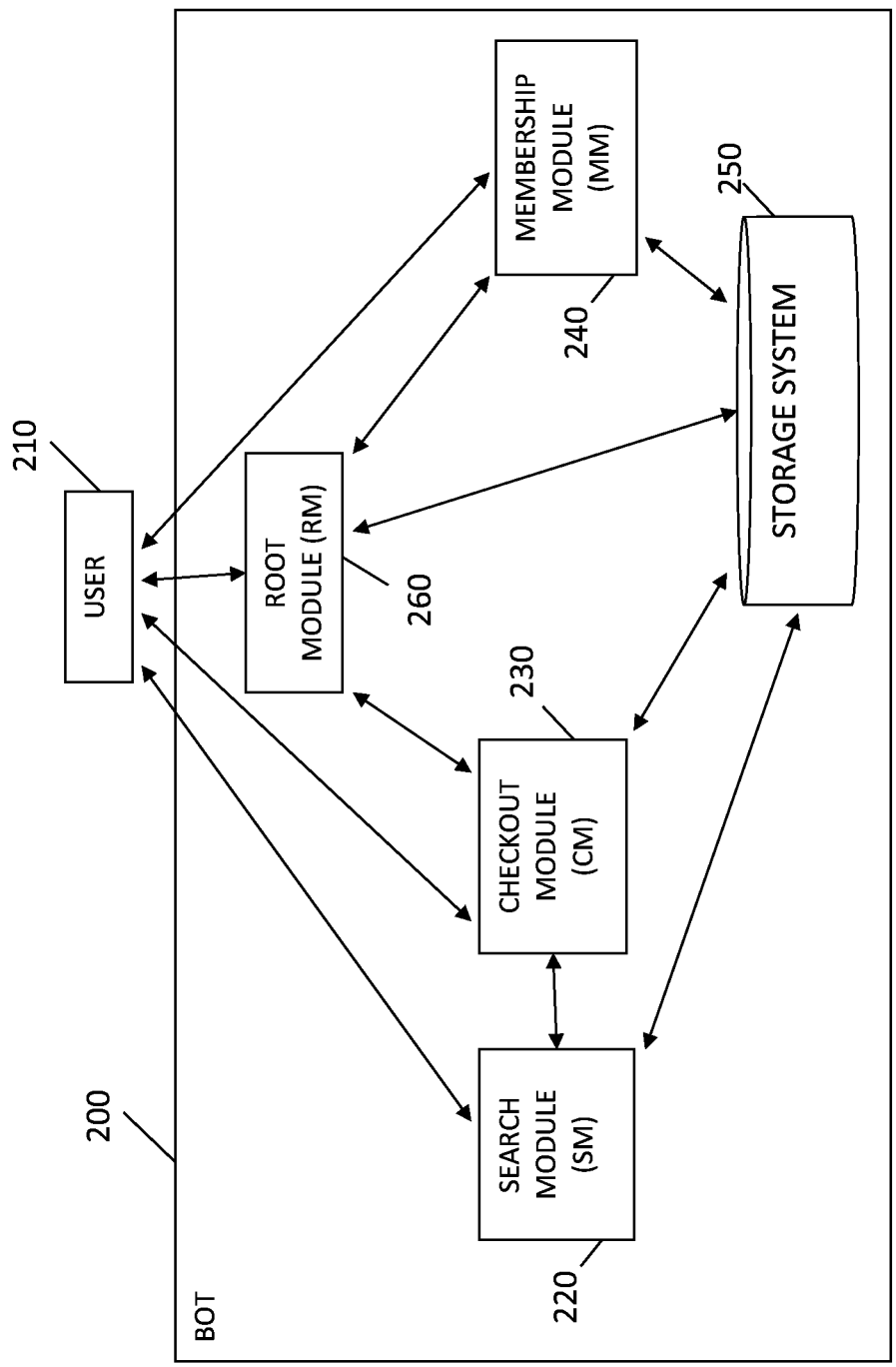
FIG. 2 is an overview of a bot and flows according to some embodiments of the present invention.

Reference is made to FIG. 2, which is a block diagram of a bot 200 and data flow between its components and a user, according to some embodiments of the present invention. As shown, a bot 200 may interact with a user 210 and may include a product search and selection module (SM) 220, a checkout module (CM) 230, customer membership module (MM) 240, and a root module (RM) 260. It will be noted that although only four modules are shown in FIG. 2, any number of modules may be included in bot 200. Additionally, the modules listen herein as SM, CM, and MM, and their functionalities, are meant to serve only as an example which is useful for understanding how bot 200 operates.

As further shown, bot 200 may include, or may be operatively connected to, a storage system 250. Storage system 250 may be, or may include, a memory such as memory 120 and/or other storage systems, e.g., storage system 130. For example, in some embodiments, storage system 250 is used for storing interaction states 131 and module states 132 described herein. Bot 200 or components of bot 200 may include components such as those shown in FIG. 1. For example, each of SM 220, CM 230, MM 240 and RM 260 may be, or may include, a controller 105, a memory 120 and executable conde 125.

As illustrated by the double-headed arrow connecting SM 220 and storage 250, modules in bot 200 can read/write data from/to storage system 250. For example, modules in bot 200 can write, store or update interaction states 131 and/or module states 132 in storage system 250 and/or read or retrieve such objects from storage system 250.

In some embodiments, interaction states 131 include any information related to a session, interaction or conversation with a user. In some embodiments, an interaction state 131 includes the state and/or context of the session, e.g., details already provided by the user during the session, services provided, requests made by the user, tasks or requests already handled and so on. Accordingly, any knowledge, data or information related to a session with user 210 may be known to and/or shared by all modules in bot 200. State of a conversation or session and/or of a module can include, for example, whether or not input from user is required, ID of module currently conversing with user, call duration, time and date, modules' names etc. Context of a conversation or session and/or of a module can include, for example, the user is a VIP client, user's gender and age, new/existing client etc.

In some embodiments, module states 132 include module specific information related to a session, interaction or conversation with a user. For example, a module state 132 includes the current or last state and/or context of the module, internal operations performed or pending and so on. In some embodiments, a module can save more than one module states 132, e.g., for a number of different sessions. For example, a module can save a first module state 132 for a first session by linking or associating the first module state 132 to a first interaction state 131 (e.g., using pointers or references as known in the art) and, save a second module state 132 for a second session by linking the second module state 132 to a second interaction state 131. Accordingly, embodiments of the invention can support, conduct or participate in, several sessions that may be interleaved in time, or interrupted and resumed while maintaining the state and context of the sessions.

As illustrated by the double-headed arrow connecting root RM 260 and MM 240, modules in bot 200 can communicate. For example, RM 260 may provide data to MM 240 (e.g., a pointer to information related to a session in storage system 250) and/or RM 260 may command or otherwise cause CM 230 to interact with user 210.

Embodiments of the invention enable a bot to use or include several modules such that, as viewed or perceived by a user conversing with the bot, he/she is simultaneously conversing with several entities, e.g., with several agents or representatives in a conference call or in the same room. For example, in a typical scenario, SM 220 converses with user 210 and helps with searching and selecting an item to purchase in a store. Before or upon transferring command or control of the session with the user to another module in bot 200, SM 220 stores, in an interaction state 131 in storage 250, the state, context and/or any other information related to the session as described herein. In addition, SM 220 stores, in a module state 132 in storage 250, its own state, context or other aspects with respect the current session, e.g., SM 220 records in a module state 132 items searched, items already seen or selected by user 210 and so on.

Next, command or control of the session is transferred to another module, e.g., to RM 260 who decides to transfer control to CM 230 which handles checkout. Before or upon assuming control of the session or before conversing with user 210, CM 230 reads the interaction state 131 stored in storage 250 by SM 220 and thus, provided with the state and context of the session, CM 230 can seamlessly and coherently continue the session with user 210. In the case where CM 230 has participated in the current session in the past (e.g., before SM 220 in the current example) then CM 230 also reads its state and context from a module state 132 associated with the current session.

In contrast, in many prior systems and methods, the user (or caller) is conversing with one module at a time, when a conversation with a first bot module ends, e.g., a caller is transferred to a second bot module, the second module knows nothing about the conversation with the first module, thus, a user may need to repeat or explain issues already discussed with the first module.

By enabling modules to communicate or interact and share data as described, embodiments of the invention enable several modules or skills to participate and cooperate in a single session with a user while maintaining and observing the context, state and flow of the session.

Figure 3:
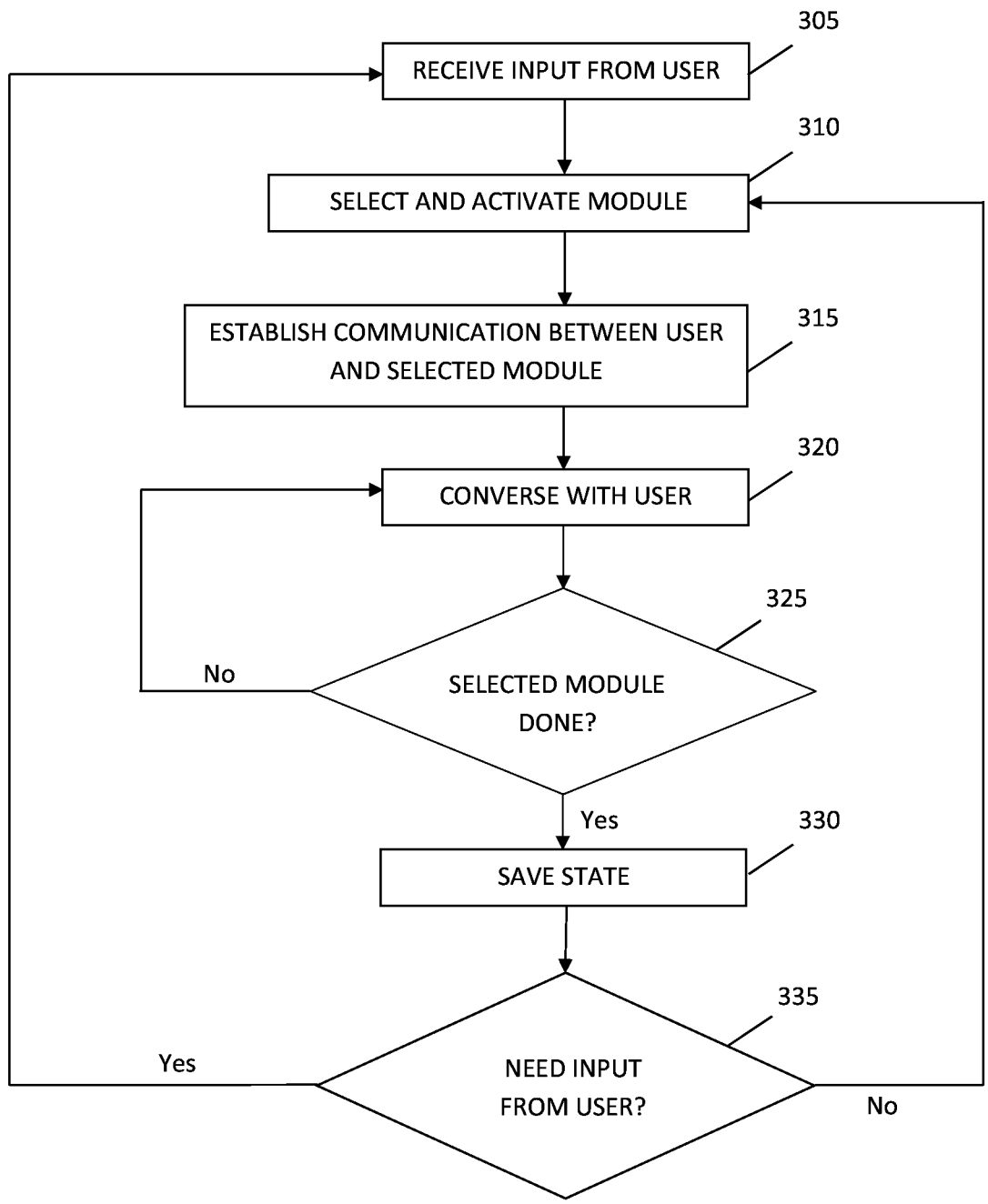
FIG. 3 shows a flowchart of a method according to illustrative embodiments of the present invention.

Reference is made to FIG. 3, a flowchart of a method according to illustrative embodiments of the present invention. As shown by block 305, a method may include receiving input from a user, for example, in some embodiments, RM 260 receives text or an utterance from user 210. Although not shown in FIG. 3, in some embodiments, RM 260 requests as much input from user 210 as required. For example, if based on input from user 210 RM 260 cannot select a module with sufficient confidence level as described then RM 260 requests user 210 to provide more information, repeat a request etc.

As shown by block 310, a method may include selecting and activating a module. In some embodiments, each of SM 220, CM 230, MM 240 and RM 260 includes (e.g., in the form of, possibly shared, controller 105, memory 120 and executable 125) a function or application (denoted herein conf(u)) that, given input "u", provides a confidence score or level (e.g., a number or value in the range of 0-100). A score calculated, used or provided by modules can be any suitable value, rank or degree that reflects or indicates how relevant a module is to "u" and/or how relevant input "u" is to the module. For example, by comparing or matching words or phrases received from user 210 to a set of (module specific) words or phrases, each of SM 220, CM 230 and MM 240 returns to RM 260 a relevance or suitability score, number or value that indicates how relevant or suitable the module is with respect to the input. It will be noted that selection and/or activation of a module as shown by block 310 may be triggered, executed or invoked at any time or step during a flow. For example, if at any time or phase, a module determines it cannot serve a request, parse input from a user or perform an action based on user input, the module may return control of a session to RM 260 that may select or reselect a module for interacting with the user.

A new module added to bot 200, or a new (or yet unknown) capability of an already known module can be automatically identified, characterized or discovered. For example, RM 260 broadcasts input from user 210 to all modules included in, or associated or registered with bot 200 (e.g., "u" is placed in a shared memory that is continuously, iteratively, periodically, or repeatedly checked by all modules in bot 200). In response to a broadcasted "u", a new module (e.g., a module that was added to or included in bot 200 while a conversation with user 210 is in progress) returns to RM 260 its relevance score thus enabling RM 260 to identify topics, phrases or terms that can be handled by the new module. For example, a module designed to handle customer complaints can be added to bot 200 at any time, even during a conversation with a customer and, upon receiving input such as "I'd like to complain about the service" from the customer, the newly added customer complaints module returns a relatively high score that causes the new module to be selected and activated as described. In another example, if functionality or capability of handling customer complaints is added to CM 230, e.g., CM 230 is updated or replaced by a new version (again, at any point in time, even during a conversation with a customer) then the next time a term related to complaint or dissatisfaction is mentioned by user 210 CM 230 is selected by RM 260. Accordingly, capabilities, functionalities, skills and modules of a bot can be dynamically discovered, identified, characterized and used by embodiments of the invention.

Characterizing or identifying modules and/or their capabilities can be an ongoing and dynamic process where based on responses and input (e.g., confidence levels and failure reports) from known and new modules RM 260 continuously, iteratively, repeatedly or periodically updates a list of modules and includes, in the list, any data or metadata, e.g., performance (e.g., key performance indicators (KPIs) values, skills, success and failure rates, suitability to various aspects, e.g., gender, age, location and the like. For example, bot 200 can include first and second modules that can serve similar purposes and, based on recording their performance as described, RM 260 selects to use one and not the other.

For example, CM 230 calculates its relevance score or value by comparing or matching words or phrases in the input to a set of words or phrases such as: "pay now", "credit card" and "shopping cart" and SM 220 calculates its relevance score or value by comparing or matching words or phrases in the input to a set of words or phrases such as: "inventory", "see more items" and "sports". Accordingly, in the above example, given input "u" that is "I'd like to pay now", CM 230 returns a high confidence level, value number or score, e.g., 89 and, for the same input "u" SM 220 returns to RM 260 a relatively low confidence level, value number or score, e.g., 23. In some embodiments, to select a module for conversing with user 210, RM 260 compares confidence levels, values numbers or scores returned from a set of modules and selects the module that returned the highest confidence level, value number or score. It will be understood that any other function or logic may be used by RM 260 for selecting a module based on a set of confidence levels, values numbers or scores as described. For example, in addition to scores or values as described, a state or context of the conversation with user 210 and/or state or context of specific modules may be considered when selecting a module that will converse with a user.

In some embodiments, instead of, or in addition to, a conf(u) function performed by each module, RM 260 executes a function denoted Conf(u) that provides, with respect to input "u", a list of modules and their respective confidence score, rank or level. For example, RM 260 receives from each module in bot 200 a list of user utterances, words or phrases that are relevant to the module's capabilities or functions, and uses the lists to select modules, e.g., by comparing or matching terms or phrases in input to terms or phrases in the lists. A list provided by a module as described may include words or phrases and associated weights or ranks. For example, a list from (or used by) CM 240 includes the term "checkout" with a rank of 100 and the term "pay" with a rank of 85. Ranks associated with supported terms can be used in selecting modules as described, for example, if "pay" is mentioned by user 210 and "pay" appears in the list of supported terms of CM 230 with a rank of 85 and also appears in a list of supported terms of CM 240 with a rank of 76 then RM 260 may (e.g., if no other considerations are relevant) select CM 230.

In some embodiments, a dynamically or newly added module provides RM 260 with a list or table that associates, or link, terms to ranks. For example, upon being included in chatbot 200, a module may provide RM 260 a list that associates the rank of 9 with the term "checkout", the rank of 3 with the term "credit" and so on. Lists or tables provided by modules as described may be used as input to Conf(u) as described herein, thus automatic and/or dynamic discovery is facilitated.

Accordingly, RM 260 can select a module for conversing with user 210 without consulting modules in bot 200. For example, RM 260 may monitor input from user 210 and dynamically, while or during the session is in progress, select or switch modules that converse with user 210, e.g., RM 260 may interrupt a conversation between SM 230 and user 210 and select CM 240 to interact with user 210.

Selection and activation of a module as shown by block 310 may be based on input from user 210 as described and further based on a state or context of a session (e.g., as stored in an interaction state 131) and/or based on one a state or context of one or more module (e.g., as stored in one or more module states 132). For example, if input from user 210 is something like "I'd like to checkout soon" while SM 230 is searching for products for user 210 (e.g., its state in its module state 132 is "search in progress") then although a conf(u) function described herein indicates that CM 240 is the most relevant module, based on the state of SM 230, RM 260 selects and activates SM 230. As further shown, after selecting a module, RM 260 activates or executes the module. The terms trigger, execute, invoke and activate as used herein may mean, or relate to, causing a module to operate or function, accordingly, these terms may be used interchangeably herein.

As shown by block 315, communication between a selected module and a user may be established. For example, having selected and activated MM 240 as described, RM 260 sets up a communication channel between MM 240 and user 210 such that input from user 210 is provided or routed to MM 240 and output from MM 240 is provided or routed to users 210. For example, shared memory, message queues or sockets as known in the art may be used for establishing and maintaining a communication channel between a module and a user.

In some embodiments, e.g., in order to ensure that only one module converses with a user at a time, a token is provided by RM 260 to only one module at a time, and only the module with the token converses with the user. If or when desired, to enable a conference call that includes the user and more than one module, RM 260 provides a set of tokens to a respective set of modules. In some embodiments, all data traffic from/to users 210 is via RM 260 thus RM 260 has full control of a session and is able to include and/or exclude modules in/from a session.

As shown by blocks 320 and 325, in some embodiments, a selected and activated module converses with a user and continuously, periodically, iteratively or repeatedly checks whether or not it is done conversing with (or serving) the user. For example, after providing a list of goods to user 210, SM 220 asks user 210 if she/he wants to search for additional items, if user 210 says "No, I'd like to proceed to checkout" then SM 220 determines it is no longer the right module for conversing with user 210 (e.g., based on calculating its relevance score as described) and transfers control of the session to RM 260 (e.g., by returning a token).

A module may generally converse or interact with a user until it determines it can no longer communicate with the user and/or cannot serve the user, e.g., it is done providing a service or it fails to understand the user (e.g., fails to identify a term that it knows or supports as described), in which case a token held by the module may be returned to RM 260, RM 260 may either request more input from the user or select another module as described. For example, if a module signals RM 260 that it failed to match input from user 210 to its supported terms then RM 260 uses the last utterance or input from user 210 to select (or discover) another module as described.

As shown by block 330, a state may be saved. For example, either before or upon releasing or returning control of a session, SM 220 saves state and context information in an interaction state 131 and/or module state 132 as described.

As shown by block 335, a flow may include determining whether or not more input from a user is required. For example, if, based on input from user 210, SM 220 determined it is done, e.g., it cannot serve a request from user 210 then, in block 335, RM 260 determines no additional input from user 210 is required and the flow returns to block 310 where another module is discovered or selected and activated based on the last input received from user 210. If more input is required, then the flow returns to block 305 and additional input is requested from user 210 as described.

In some embodiments, RM 260 associates modules with names and presents or provides that names to user 210. For example, RM 260 may associate the name "John" with MM 240 and the name "Jeff" with CM 230 and present or provide the names' associations to user 210, e.g., inform user 210 that Jeff can help with checkout. Selection and activation of a module as shown by block 310 may be based on a module's name. For example, referring to the above example, based on input from user 210 that includes "I'd like to get more details from John" RM 260 selects MM 240 to converse with user 210. Accordingly, user 210 is enabled to freely switch between modules in bot 200 and/or modules can be triggered or activated by, mentioning their names, by mentioning a topic, by requesting a service or otherwise as described herein.

Additional input from a user can be requested by a module or it can be offered by the user. For example, if MM 240 fails to understand user input or determines it is unable to serve the user then MM 240 may say, or output to the user, "let me refer you to someone else", if, in such case, the user says "but I do want to stay with you and I can rephrase" then MM 240 may receive additional input from the user. Accordingly, accuracy related to interpreting input from a user or understanding a user can be increased.

In yet other cases, if while interacting with a first module, the user explicitly mentions a name of a second module than the first module may transfer control of the conversation to RM 260 or to the module mentioned by the user. For example, RM 260 may inform all modules in bot 200 of dynamically assigned or associated names (e.g., John and Jeff in the above example) thus enabling modules to trigger each other based on their associated names.

In some embodiments, automatic and/or dynamic module (or skill) discovery enables user 210 to freely interact with modules in bot 200 without any preliminary knowledge. For example, user 210 needs not know in advance what skills or modules are available in bot 200, their names, and/or the functionality that they provide. For example, based on input from user 210 (e.g., "I'd like to review my shopping cart before checking out") and using logic for finding the most relevant module as described, RM 260 finds or discovers the right, most suitable module (e.g., CM 230), names CM 230 "John", outputs to (or informs) user 210 that "John can help with this" and establishes a communication channel between CM 230 and user 210 as shown by block 315.

Dynamic and/or automatic association of names with modules may be recorded and/or updated throughout a session or conversation with a user, e.g., stored in an interaction state 131. By linking or associating an interaction state 131 with a specific user, the modules' names in the interaction state 131 can be used in current and/or future calls, conversations or interactions with that user. For example, if CM 230 was named John in a conversation with a specific user held on Monday then an association of CM 230 with the name John is stored in an interaction state 131 and, if that specific user calls again on Tuesday, the name John is used again for handling checkout by CM 230. Moreover, using information in a module state 132 stored on Monday, CM 230 can, on Tuesday, adequately mimic a human agent named John who remembers the conversation held on Monday. In yet other cases, a user (e.g., caller) might wish to speak with the agent he/she spoke with last time, for example, the user might say "I spoke yesterday with Rachel from accounting, can I speak with her again?", based on data in an interaction state 131 associated with the user (e.g., associated with a phone number, email address or other user ID), RM 260 may identify the module that was named Rachel in a previous conversation with the caller and select that module for conversing with the caller. Accordingly, a conversation between a user and modules in bot 200 can be interrupted and resumed, either during a conversation or over time, while context and state of the conversation and context and state of the modules is maintained. In addition and as described, modules in bot 200 can cooperate, co-exist or inter-operate in a session with a user.

As described, embodiments of the invention enable interconnecting modules in a chatbot, for example modules designed, adapted or configured to support features or logic such as naming, interrupt and resume, auto-discovery, automatic invocation of modules, switching between modules and/or other flows and operations as described herein can be used (or reused) by any number of bots, thus embodiments of the invention enable reusable bot modules that can be readily used for providing various types of bots.

In some embodiments (referred to herein as "vanilla system" or "vanilla configuration"), the naming protocol logic, flow, support or mechanism as described herein are not included or supported. For example, in a vanilla configuration, RM 260 does not associate modules in bot 200 with names and consequently, does not introduce names to user 210, and a system does not trigger, invoke or switch modules based on names mentioned.

In terms of user experience, although bot 200 in a vanilla system is composed of distinctive modules, the user is unaware of their existence, and all communications or messages are perceived, by the user, as coming from a single bot or entity. For example, in a vanilla system, exactly one module has the token over the communication channel with user 210 at any given moment, and RM 260 controls and executes routing messages to and from the right module. In a vanilla configuration, initially RM 260 has the token, and given an input message from user 210, RM 260 executes the conf(u) method or function and triggers the appropriate or selected module as described. For example, RM 260 selects to activate CM 230, provides a token to CM 230 and routes all messages to/from user 210 from/to CM 230 until CM 230 signals or indicates that is done, e.g., as described with respect to block 325 in FIG. 3.

Accordingly, in a vanilla configuration, there is no way for user 210 to intentionally, specifically or on purpose, switch from a first module (e.g., from CM 230) to a second, different module (e.g., to MM 240) during a conversation. Switching modules in a vanilla configuration is automated and/or accomplished by having RM 260 configured to use the last input or utterance from user 210 for module discovery, selection and/or activation, e.g., as described with reference to block 310 in FIG. 3. For example, when CM 230, RM 260 discovers or selects and activates MM 240 and provides MM 240 with the token and the last input from user 210, that is, the input that caused CM 230 to indicate it is done. A vanilla configuration or system as described can desirable in some cases, e.g., in places or cases where callers or users prefer talking to a single entity or agent, another example is when a very small number of modules are included in a bot and speed or efficiency are a concern.

For example, a conversation using the vanilla configuration is produced below where "Agent" is coming from one of the modules in bot 200 as indicated.

Agent (RM 260): Hi, how can I assist you today?
User 210: I would like to review my membership points
Agent (MM 240): May I know your email address?
User 210: davida@il.ibm.com
Agent (MM 240): pin code?
User 210: You know what, let's just checkout
Agent (CM 230): I can help you checkout, what's your address?
User 210: Astor place, NY
Agent (CM 230): Credit card details, pls
User 210: About the pin code, I finally found it. It's 12345.
Agent (MM 240): Great, your membership status is Silver and you have 500 points.

For comparison, a conversation using a system and/or method that include or support naming modules, state and context sharing and other logic, flows and mechanisms as described herein is produced below where RM 260 is mimicking or simulating, and is introduced to user 210 as agent "Alice", MM 240 is named, and acts as agent "John" and CM 230 agent Jeff.

Alice: Hi, how can I assist you today?
User 210: I would like to review my membership points
Alice: John, from our membership management can help you.
John: May I know your email address?
User 210: davida@il.ibm.com
John: pin code?
User 210: You know what Alice, let's just checkout
Alice: Jeff, from checkout can help you.
Jeff: Hi, I can help you checkout, what's your address?
User 210: Astor place, NY
Jeff: Credit card details, pls
User 210: John, about the pin code, I finally found it. It's 12345.
John: Great. Thanks, your membership status is Silver and you have 500 points.

In some embodiments, modules are adapted to verify details. For example, if after providing the address in the above example, the user says "Jeff, sorry about that, the address I gave you is not where I leave", then Jeff, who needs to find out if the user referred to billing or shipping address can ask the user to rephrase, e.g., output to user 210 "Can you please rephrase? Did you mean shipping address or billing address?". Accordingly, even without specific training of a module (Jeff) to identify "where I leave" as "Shipping address", a misunderstanding will be prevented, e.g., a module that needs a shipping address can request a user to rephrase until it is certain that a shipping address was provided by the user.

Note that while conversing with Jeff, user 210 is addressing John and John replies. Moreover, when John joins the conversation because his name was mentioned, John is in full context, that is, John knows that before conversing with Jeff, user 210 wanted to review her membership points and provides the requested information. Further note the user 210 does not need to know the names of agents in advance, that is, agents are triggered based on their names or based on a topic mentioned, additionally and as exemplified in the above example, agents collaborate or coexist, that is, they all participate in the conversation, they can be interrupted, and then resumed or activated to their last state and with full context of the conversation as if they are all listening in.

As described, embodiments of the invention improve the fields of centralized office, e.g., call centers, intelligent personal assistants, automated chat or interactive voice response (IVR) systems or any voice control system, e.g., by introducing a multi-module bot where several modules collaborate and participate in a conversation, switch roles and maintain context and state as described. In addition, embodiments of the invention are computer-centric and are inextricably tied to computer technology, e.g., computerized voice control system, digital assistants, interactive voice response (IVR) systems and the like. Additionally, embodiments of the invention address the computer-centric challenge of conversing with humans. It is noted that embodiments of the invention do more than merely manipulating or communicating data, e.g., data structures such as state objects 131 and module state objects 132 are created, stored, updated and used as described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

The invention claimed is:

1. A method comprising: operating a computerized chatbot to:
   receive an input from a user, the input comprising one or more words;
   calculate first and second scores representing a relevance of the input received from a user to functionalities provided by respective first and second modules associated with the chatbot, wherein the calculation is based on a matching of the one or more words comprised in the input to two lists of words or phrases, the two lists being associated with the first and second modules, respectively, and wherein the first and second modules are software applications each capable of providing a different service to the user;
   associate the first and second modules with respective first and second names; when the first score is higher than the second score inform the user of the name of the first module and of the capability of the first module, and then provide the service of the first module to the user;
   when the second score is higher than the first score: inform the user of the name of the second module and of the capability of the second module, and then provide the service of the second module to the user; and
   enable the user to interact with the first and second modules by mentioning their respective names;
   operating the computerized chatbot to: save a state of the first or second module with respect to an interaction of the first or second module with the user; interrupt operation of the first or second module, respectively; and resume operation of the first or second module, respectively, based on the state.

2. The method of claim 1, further comprising operating the computerized chatbot to: save a state of an interaction of the first module with the user; select a the second module to interact with the user based on the state; and provide the state to the second module.

3. The method of claim 1, wherein the interrupting of the operation is caused by detecting the user mentioned the name of the second module.

4. The method of claim 1, wherein the interrupting of the operation is performed by a module included in the chatbot.

5. The method of claim 1, further comprising operating the computerized chatbot to: identify a new module based on a score received from the new module; and select the new module to interact with the user.

6. The method of claim 1, further comprising operating the computerized chatbot to: identify the capability of each of the first and second modules based on a score received from the respective, module.

7. The method of claim 1, wherein the calculating of the first and second scores is by one of: a root module, and respectively by the first and the second modules.

8. The method of claim 1, wherein the selecting of the module is based on at least one of: an event, a context, a state, and input from the user.

9. The method of claim 1, further comprising requesting additional information from the user and selecting a module to interact with the user based on received additional information.

10. The method of claim 1, wherein the input received from the user is at least one of: an utterance, an interaction with a graphical user interface (GUI) object, and a text.

11. A computerized chatbot implemented on a non-transient computer-readable storage medium that comprises instructions to:
   receive an input from a user, the input comprising one or more words;
   calculate first and second scores representing a relevance of the input received from a user to functionalities provided by respective first and second modules associated with the chatbot,
   wherein the calculation is based on a matching of the one or more words comprised in the input to two lists of words or phrases, the two lists being associated with the first and second modules, respectively, and
   wherein the first and second modules are software applications each capable of providing a different service to the user; associate the first and second modules with respective first and second names;
   when the first score is higher than the second score inform the user of the name of the first module and of the capability of the first module, and then provide the service of the first module to the user;
   when the second score is higher than the first score inform the user of the name of the second module and of the capability of the second module, and then provide the service of the second module to the user; and
   enable the user to interact with the first and second modules by mentioning their respective names;
   operating the computerized chatbot to save a state of the first or second module with first or second module, respectively; and resume operation of the first or second module, respectively, based on the state.

12. The computerized chatbot of claim 11, wherein the instructions are further to: save a state of an interaction of the first module with the user; select a the second module to interact with the user based on the state; and provide the state to the second module.

13. The computerized chatbot of claim 11, wherein the instructions are further to: save a state of the first or second module with respect to an interaction of the first or second module with the user; interrupt operation of the first or the second module, respectively; and resume operation of the first or the second module, respectively, based on the state.

14. The computerized chatbot of claim 13, wherein said interrupting operation is caused by detecting the user mentioned the name of the second module.

15. The computerized chatbot of claim 13, wherein said interrupting operation is performed by a module included in the chatbot.

16. The computerized chatbot of claim 11, wherein the instructions are further to: identify a new module based on a score received from the new module; and select the new module to interact with the user.

17. The computerized chatbot of claim 11, wherein the instructions are further to: identify the capability of each of the first and second modules based on a score received from the respective module.

18. The computerized chatbot of claim 11, wherein said calculating of the first and the second scores is by one of: a root module, and respectively by the first and second modules.

19. The computerized chatbot of claim 11, wherein the selecting of the module is based on at least one of: an event, a context, a state, and input from the user.

* * * * *